US012258086B2

(12) United States Patent
Maresca

(10) Patent No.: US 12,258,086 B2
(45) Date of Patent: Mar. 25, 2025

(54) SEAT COVER FOR MOTORCYCLES EQUIPPED WITH MULTIFUNCTION ELECTRONIC UNIT

(71) Applicant: Vincenzo Maresca, Terracina (IT)

(72) Inventor: Vincenzo Maresca, Terracina (IT)

(73) Assignee: Vincenzo Maresca, Terracina (IT)

( * ) Notice: Subject to any disclaimer, the term of this patent is extended or adjusted under 35 U.S.C. 154(b) by 69 days.

(21) Appl. No.: 18/015,697

(22) PCT Filed: Jun. 4, 2021

(86) PCT No.: PCT/IB2021/054910
§ 371 (c)(1),
(2) Date: Jan. 11, 2023

(87) PCT Pub. No.: WO2022/013637
PCT Pub. Date: Jan. 20, 2022

(65) Prior Publication Data
US 2023/0182842 A1    Jun. 15, 2023

(30) Foreign Application Priority Data

Jul. 13, 2020   (IT) .................. 102020000016990

(51) Int. Cl.
*B62J 1/28* (2006.01)
*B62J 1/20* (2006.01)
(Continued)

(52) U.S. Cl.
CPC .  *B62J 1/28* (2013.01); *B62J 1/20* (2013.01); *B62J 6/05* (2020.02); *B62J 50/22* (2020.02)

(58) Field of Classification Search
CPC ......... B62J 6/05; B62J 1/28; B62J 1/20; B62J 50/22
See application file for complete search history.

(56) References Cited

U.S. PATENT DOCUMENTS 6,068,339 A * 5/2000 Linzalone ................ B60N 2/50
297/463.1
6,091,321 A * 7/2000 Karell ...................... B60Q 1/34
340/459
(Continued)

FOREIGN PATENT DOCUMENTS

CN      2214186 Y    12/1995
CN    200942819 Y     9/2007
(Continued)

OTHER PUBLICATIONS

European Patent Office, International Search Report issued in PCT/IB2021/054910, mailed Sep. 1, 2021, Rijswijk, NL.
(Continued)

*Primary Examiner* — Milton Nelson, Jr.
(74) *Attorney, Agent, or Firm* — Ferguson Case Orr Paterson

(57) ABSTRACT

A device has a seat cover suitable for being fastened to a seat of a motorcycle, whose upper surface is divided in a plurality of portions, each positioned on a right side or a left side of the seat cover, each portion of the plurality of portions being associated to a respective vibration motor, configured to generate vibrations perceivable by a motorcyclist sitting on the seat of the motorcycle, and an electronic unit configured to control the vibration motors and provided with connectors to an onboard electronic box of the motorcycle. The electronic unit is configured to receive from the onboard electronic box a signal relating to an activation status of directional indicators of the motorcycle and to control the vibration motors as a function of the signal relating to the activation status of the directional indicators.

13 Claims, 3 Drawing Sheets

(51) Int. Cl.
*B62J 6/05* (2020.01)
*B62J 50/22* (2020.01)

(56) References Cited

U.S. PATENT DOCUMENTS

| | | | | |
|---|---|---|---|---|
| 7,239,233 | B2 * | 7/2007 | Danowski | B60Q 9/00 340/407.1 |
| 10,478,372 | B1 | 11/2019 | Rock | |

FOREIGN PATENT DOCUMENTS

| | | | | |
|---|---|---|---|---|
| CN | 203544215 | U | 4/2014 | |
| CN | 207045504 | U | 2/2018 | |
| CN | 111114673 | A | 5/2020 | |
| DE | 20218933 | U1 * | 3/2003 | B60Q 11/00 |
| DE | 202019001110 | U1 | 6/2020 | |
| EP | 2617637 | B1 | 6/2019 | |
| JP | 4083402 | B2 | 4/2008 | |
| JP | 2009179242 | A | 8/2009 | |

OTHER PUBLICATIONS

European Patent Office, International Written Opinion issued in PCT/IB2021/054910, mailed Sep. 1, 2021.
Italian Patent Office, Search Report issued in 102020000016990, mailed Mar. 1, 2021.

* cited by examiner

SEAT COVER FOR MOTORCYCLES EQUIPPED WITH MULTIFUNCTION ELECTRONIC UNIT

CROSS-REFERENCE TO RELATED APPLICATIONS

This application is a National Phase Application of PCT International Application No. PCT/IB2021/054910, having an International Filing Date of Jun. 4, 2021 which claims the benefit of priority to Italian Patent Application No. 102020000016990, filed Jul. 13, 2020, each of which is hereby incorporated by reference in its entirety.

FIELD OF THE INVENTION

The present invention relates to the technical field of devices apt to maximize a motorcycle pilot comfort and safety. More in particular, the present invention relates to a motorcycle seat cover provided with a multifunctional electronic unit configured to give the motorcyclist a feedback relating to the motorcycle conditions, and in particular, relating to the directional indicators activation.

Therefore, the present invention aims at developing a multifunctional system contributing to a higher road safety for the motorcyclist and, at the same time, at increasing the same pilot driving and seating comfort.

BACKGROUND OF THE INVENTION

The technical problem is in that the most important aspect for a motorcyclist is road safety, and high speed is not always the only cause of crashes.

In fact, there are many parameters to be considered: casualness, impact mode, presence of other people on the road, motorcycle electronic devices, comfort and driving capacity level are important factors as well.

Among the risk factors, the motorcyclist usage, often wrong, despite himself, of directional indicators, commonly blinkers, is particularly important.

Motorcycles are provided with four directional indicators to signal others the change of driving direction preventively.

The signal of activated indicator is given by means of a flashing light.

Anyway, the motorcyclist, who drives concentrated and looking constantly at the road in order not to be disturbed, can easily forget to disactivate the directional indicator after using it, and does not realize that the flashing light is still on.

Moreover, unlike other motor vehicles, motorcycles are not provided with directional indicators automatic disactivating mechanisms.

Forgetting to disactivate a directional indicator is extremely dangerous while driving on the road, since the driver of another car passing on the same road does not understand the real direction the motorcyclist is taking, with the risk of a crash.

Currently, the technical problem is solved by adding an acoustic signal to the light signal, i.e. the classical intermittent bip activating when the indicator is on; however, the motorcyclist can hardly bear this signal as well, given the strong engine roar and the acoustic isolation due to the helmet.

At the state of the art, there are known and commonly used also alternative directional signalling systems meant for motorcycles, and other systems dedicated to improving comfort during driving.

An example is the one of the Patent application no JP4083402B2 relating to a motorcycle light structure and describing a motorcycle rear light structure able to guarantee a more extended light emission area and so greater visibility, in particular of the braking indicators.

Another example is the one of the patent application Ser. No. 10/478,372 describing a massage system for motorcycle seats. This seat is aimed at improving the motorcyclist seating comfort, by providing a massage system comprising a frame provided, in its configuration, with a seat and a seat back. The massaging unit comprises an electric motor coupled to a transmission unit to propagate the massage laterally and backwards and comprises also a front massage head with a plurality of spherical massagers. The rotational head is coupled to the electric motor and a flexible seat coating is mounted on the frame and the massage unit. A controller communicates with the massage unit to activate, disactivate or adjust the massage unit. Another example is described in JP2009179242 relating to a rear lighting and directional indicator device, arranged in a housing integrated with the rear mudguard.

Another example is described in DE20218933 describing a motorcycle seat, inside which two vibration motors are introduced, one for each side, activated as a function of the directional indicators activation.

Disadvantageously, such systems provided at the state of the art try to solve the technical problems relating to the visibility of light indicators and the motorcyclist driving comfort, separately. There is no multifunctional system solving both the technical problems in only one combined device.

Moreover, such devices improve visibility of indicators to other drivers' benefit but are limited in making easier for the motorcyclist to perceive them.

Moreover, the systems known at the state of the art 25 are not easily configurable for installation on yet existing and registered motorcycles.

Moreover, the systems known at the state of the art are devices, in some case cumbersome, to be added to the whole motorcycle structure and not integrable to existing ones.

In addition, their realization is not always cheap. Advantageously, the inventive device is a multifunctional device which, besides functioning as interactive signal of activated directional indicator for the motorcyclist, is also aimed at improving seating and driving comfort remarkably.

In particular, it is a seat cover signalling the motorcyclist about the activation status of directional indicators by means of vibrations generated by vibration motors. It can be arranged on the seat of any motorcycle without modifying the same, since it can be just fixed on the motorcycle seat by means of adhesive fastening means (for example double sided adhesive tape) or by means of belts wrapping both seat and cover together, and the computing means can be connected to the motorcycle onboard electronic box without needing this to be considered in the motorcycle construction step.

The type, shape and dimensions of the connecting means are defined as a function of the electronic box model without the device functioning logics changes.

In a not limiting embodiment the device comprises a connector provided with the same connecting means to the onboard box and to all the sensors provided onboard, exactly as on the standard connector provided with the motorcycle, and comprises also another connecting means for fastening a connector of the computing means provided on the device.

The device according to the present invention is further a multifunctional system which, at the same time, is aimed at maximizing the driving comfort, since it is provided with an additional massaging band, which can be worn by the motorcyclist by wrapping it around his waist, and aimed at maximizing the travel safety.

The signal of activated directional indicator, besides by the seat cover, can be sent also by the massaging band or by means of the motorcycle handlebars, inside which vibration motors can be introduced.

Even if this fact does not limit the aims of the invention, the system can be integrated also in the motorcycle seat itself.

The systems at the state of the art aim only at improving visibility and luminosity for other drivers on the road, or aim at improving the pilot driving comfort, but they do not allow in any case to handle both the problems at the same time.

So, the problem to provide an interactive, multifunctional device, which overcomes the limits of the devices known at the state of the art and which is cheap in its realization, remains unsolved.

According to an aim, the present invention provides a multifunctional device with the aim of improving the motorcyclist usage of directional indicators, and which improves his driving comfort at the same time.

According to another aim, the present invention relates to a device which can be integrated without modifying the motorcycle.

SUMMARY OF THE INVENTION

According to another aim, the present invention provides a device configured to signal that the directional indicator is on by means of a vibration generated both by devices integrated in the seat cover and by devices integrated inside an additional massaging band, and possibly by devices integrated in the handle grips of the motorcycle itself.

Yet, according to another aim, the present invention provides to maximize the motorcyclist driving comfort by providing, besides the vibration motors arranged in the seat cover, a massaging band wearable by the motorcyclist by wrapping it around his waist.

From other aspects, aim of the present invention is to provide an electronic unit able to acquire also other signals detected by the onboard motorcycle electronics and to convert them in vibration signals which can be distinguished by means of different pulsation and intensity perceivable by the motorcyclist.

According to preferred aspects, the invention is also particularly apt to be adapted to any brand or motorcycle model.

The device according to the invention realizes the prefixed aims since it is a device comprising a seat cover (1) for a motorcycle (13), whose upper surface is divided in a plurality of portions each positioned on the right side or left side of said seat cover (1), to each one of which a respective vibration motor is associated, configured to generate vibrations perceivable by the motorcyclist while seating on the seat of said motorcycle (13), electronic computing means (7) configured to control said vibration motors and provided with connection means to the electronic onboard box (14) of said motorcycle (13), characterized in that it comprises further a massaging belt (9), which can be fastened around the motorcyclist's waist and provided with at least two massaging heads (11) positioned so that the right portion and the left portion of the motorcyclist's back is massaged and with a plurality of electrostimulation electrodes (12) and connecting means of said electronic computing means (7) to said belt (9), and in that said electronic computing means (7) are configured to receive from said onboard box (14) of said motorcycle (13) a signal relating to the activation status of the directional indicators (19) of said motorcycle (13) and to control said vibration motors (2, 3, 4, 5) and said massaging heads (11) as a function of said signal relating to the activation status of said directional indicators.

BRIEF DESCRIPTION OF THE DRAWINGS

The present invention will be now described with reference to the appended drawings.

DETAILED DESCRIPTION

Figure 1:
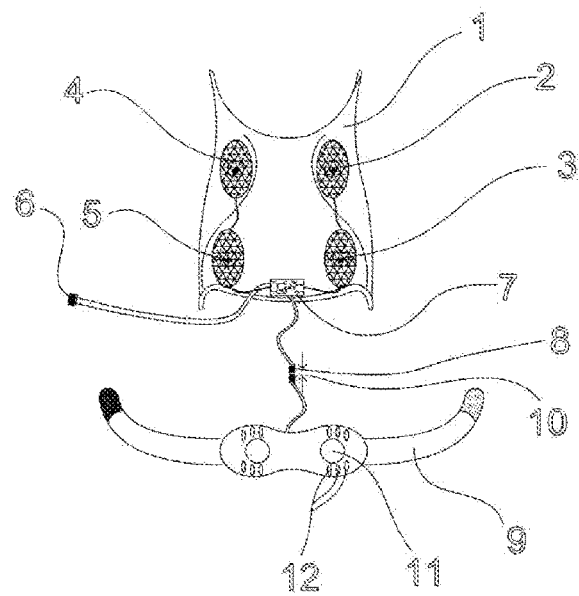
FIG. 1 shows a top view of the invention with all its essential elements.
Figure 2:
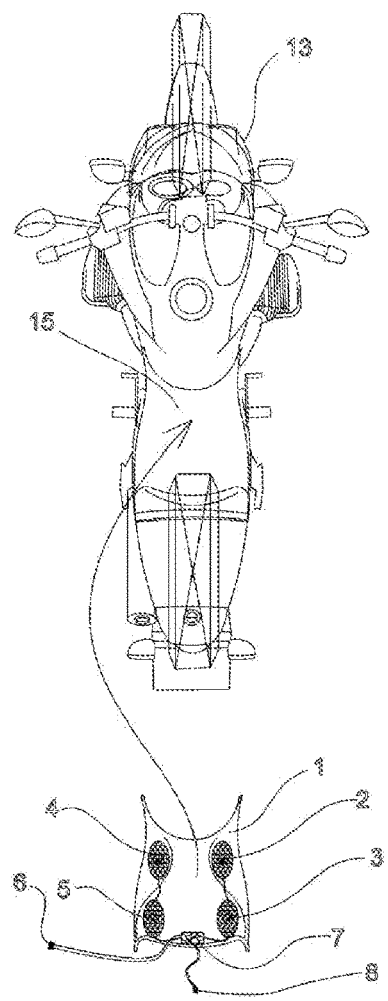
FIG. 2 shows how the seat cover (1) is positioned on the seat (15) of a motorcycle (13)
Figure 3:
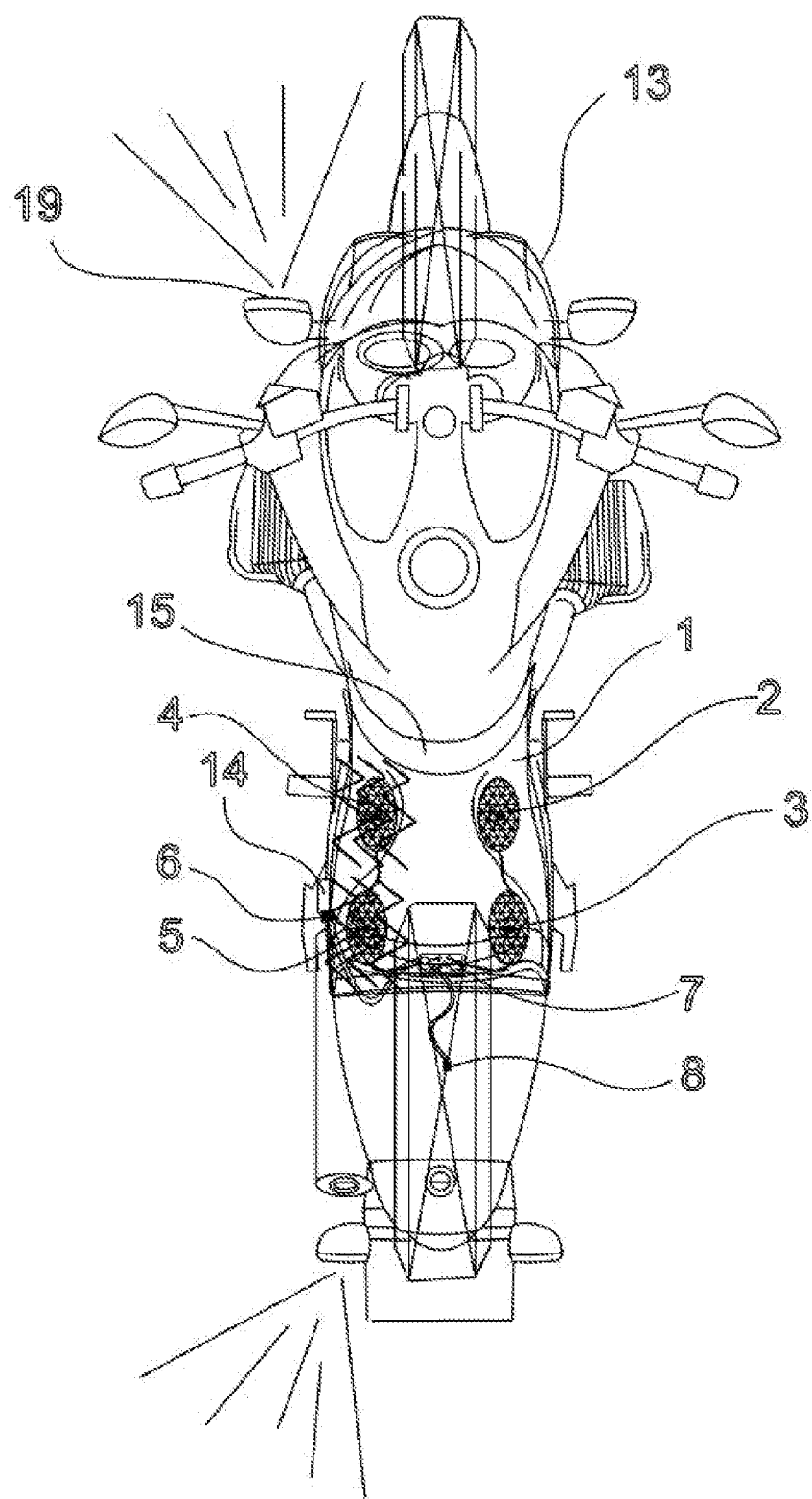
FIG. 3 shows a view of the functioning of the invention. In figure, the left directional indicator (19) is activated and at the same time the system activates the left front vibration motor (4) and left back vibration motor (5) which produces a vibration perceivable by the motorcyclist.
Figure 4:
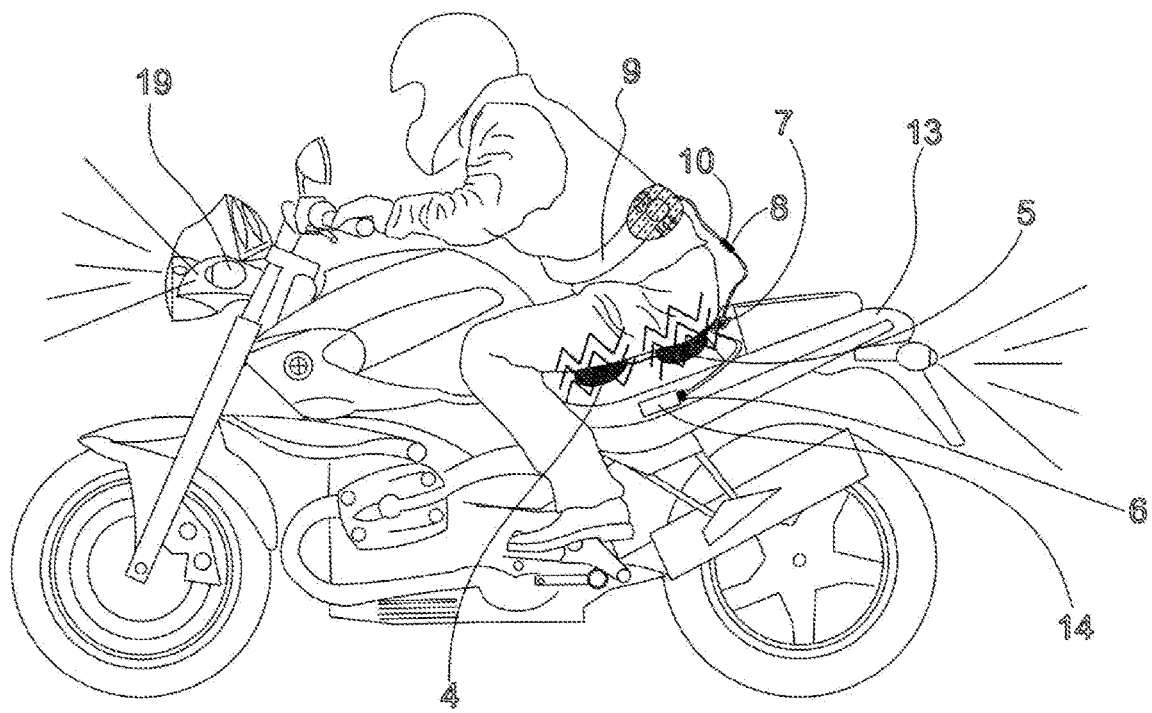
FIG. 4 shows a view of the functioning of the invention showing a motorcyclist wearing the massaging belt (9) and perceiving the vibration indicating the left directional indicator (19) activated.
Figure 5:
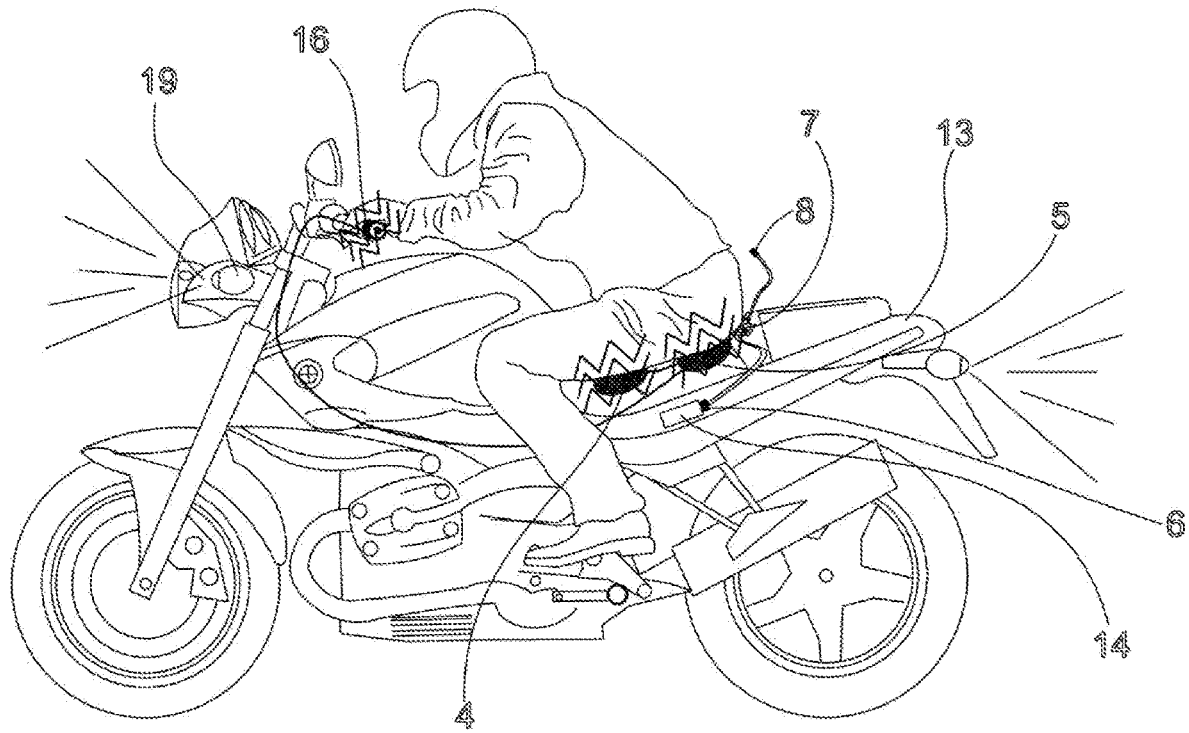
FIG. 5 shows another embodiment of the invention showing how the vibration motors are introduced, the one at the right side, the other one at the left side (16), inside the band grips of the handlebar of the motorcycle (13). In the view, the left directional indicator (19) is activated and at the same time the system activates the left front vibration motor (4) and the left back vibration motor (5) and the left vibration motor (16) inside the handle grip of the handlebar activated, which produce a vibration perceivable by the motorcyclist.

As it is shown in the appended drawings, the present invention provides a device comprising a seat cover (1) for motorcycles (13), whose upper surface is divided in four portions, each one of which being associated to a respective vibration motor.

Preferably, said seat cover (1) is divided in a right front area, where a right front vibration motor (2) is positioned, a left front area where a left front vibration motor (4) is positioned, a right back area where a right back vibration motor (3) is positioned, a left back area where a left back vibration motor (5) is positioned.

Moreover, preferably, said seat cover can be fixed on the seat of a motorcycle, or it can be positioned on the seat of a motorcycle by means of fastening means of adhesive or elastic type.

The device comprises also electronic computing means (7) integral to said seat cover (1), configured to control said vibration motors and connecting means of said electronic computing means (7) to the onboard box (14) of the motorcycle (13). To such aim, said electronic computing means are connected electrically to the right front vibration motor (2), to the right back vibration motor (3), to the left front vibration motor (4) and to the left back vibration motor (5).

Said connecting means comprise preferably a first connector (6) connecting said electronic computing means (7) to the box (14) of the motorcycle (14).

Preferably, but not limitingly, the device comprises also a massaging belt (9), which can be fastened around the cycler's waist, and provided with at least a couple of rotating massaging heads (11) at the motorcyclist's back right and left, and with a plurality of electrostimulation electrodes (12). In such an embodiment, the device comprises conveniently seat cover connecting means to said belt (9), comprising a second connector (8) going out from said electronic computing means (7), to which a respective connector (10) of a massaging belt (9) can be connected.

The device is characterized in that said electronic computing means (7) are configured to receive from said onboard box (14) of the motorcycle (13) a signal relating to the activation status of the directional indicators (19) of said motorcycle (13), and to control said vibration motors (2, 3, 4, 5) as a function of said signal relating to the activation status of said directional indicators. Preferably, said electronic unit is configured to activate the vibration motors positioned on the same side as the active directional indicator. For example, it is configured to activate the right front vibration motor (2) and the right back vibration motor (3) at the same time if the active directional indicator is the one indicating a right bend, and to activate the left front vibration motor (4) and the left back vibration motor (5) if the active directional indicator is the one indicating a left bend.

The vibration motors are configured to generate vibrations perceivable by the motorcyclist while seating on the seat cover (1).

Said electronic computing means (7) are also configured to switch off said vibration motors only when the directional indicator (19) is disactivated.

Conveniently, also, said electronic computing means (7) are configured to acquire from said onboard electronic box (14) other signals relating to the functioning of the motorcycle and to convert them in signals sent to the motorcyclist by means of vibrations of said vibration motors and which can be distinguished by the motorcyclist by means of their different frequency and/or intensity. Moreover, according to another embodiment, other vibration motors can be associated to the motorcycle handlebars, the one to the right handle grip and the other one to the left handle grip (16). In this case, said electronic unit is configured to control also said further vibration motors associated to the handlebars as a function of the activation status of the directional indicators.

Preferably, said further vibration motors are introduced inside the handlebars of the motorcycle (13).

The invention claimed is:

1. A device comprising a seat cover suitable for being fastened to a motorcycle seat, or comprising a motorcycle seat, wherein an upper surface of the motorcycle seat or of the seat cover is divided in a plurality of portions each positioned on a right side or a left side of said motorcycle seat or seat cover, each portion of the plurality of portions being associated to a respective vibration motor, configured to generate vibrations perceivable by a motorcyclist sitting on the motorcycle seat, and an electronic unit configured to control said vibration motors and provided with connecting means configured to be connected to an onboard electronic box of a motorcycle,
wherein
said electronic unit is configured to receive from said onboard electronic box of the motorcycle a signal relating to an activation status of directional indicators of the motorcycle and to control said vibration motors as a function of said signal relating to the activation status of said directional indicators.

2. The device of claim 1, further comprising a massaging belt, suitable for being fastened around the motorcyclist's waist, and provided with at least two massaging heads positioned so that right and left portions of the motorcyclist's back are massaged and with a plurality of electrostimulation electrodes, and connecting means of said electronic unit to said massaging belt, wherein said electronic unit is configured to control also said two massaging heads as a function of said signal relating to the activation status of said directional indicators.

3. The device of claim 1, wherein said electronic unit is integral to said motorcycle seat or seat cover.

4. The device of claim 1, wherein said electronic unit is configured to activate the vibration motors positioned on a same side as an active directional indicator.

5. The device of claim 1, wherein said electronic unit is configured to switch off said vibration motors only when the directional indicators are disactivated.

6. The device of claim 1, wherein said electronic unit is configured to acquire from said onboard electronic box other signals relating to functioning of the motorcycle and to convert them in signals sent to the motorcyclist by vibrations of said vibration motors and distinguishable by the motorcyclist by their different frequency and/or intensity.

7. The device of claim 1, comprising a further vibration motor configured to be associated to a right handle grip and a further vibration motor configured to be associated to a left handle grip of said motorcycle, wherein said electronic unit is configured to control also said further vibration motors configured to be associated to the right and left handle grips as a function of the activation status of the directional indicators.

8. The device of claim 7, wherein said further vibration motors are configured to be introduced inside the right and left handle grips.

9. The device of claim 1, wherein said motorcycle seat or seat cover is divided in four portions: a right front area, where a right front vibration motor is positioned, a left front area where a left front vibration motor is positioned, a right back area where a right back vibration motor is positioned, and a left back area where a left back vibration motor is positioned.

10. The device of claim 9, wherein said electronic unit is electrically connected to the right front vibration motor, to the right back vibration motor, to the left front vibration motor and to the left back vibration motor.

11. The device of claim 1, wherein said seat cover is suitable for being positioned on the seat of the motorcycle by adhesive or elastic fastening elements.

12. The device of claim 1, wherein said seat cover is fixable on the seat of the motorcycle.

13. The device of claim 1, wherein said connecting means comprise a first connector connecting said electronic unit to the onboard electronic box of the motorcycle and a second connector connecting said electronic unit to said massaging belt.

* * * * *